April 27, 1954     B. BAXTER     2,676,613
DUAL PURPOSE VALVE UNIT
Filed Aug. 16, 1952
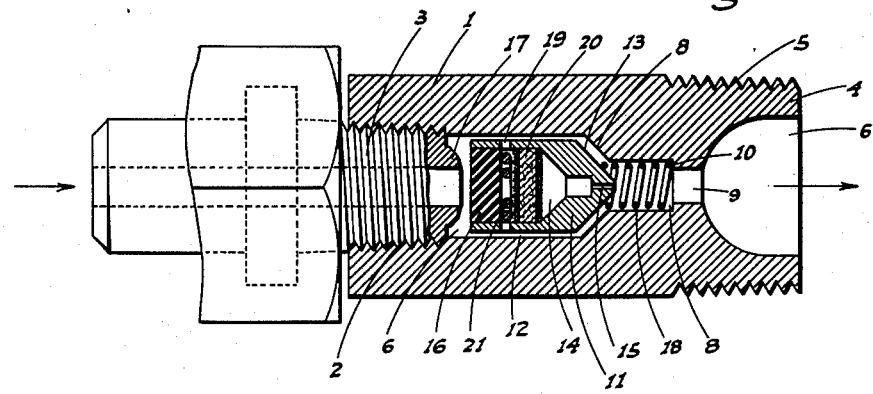
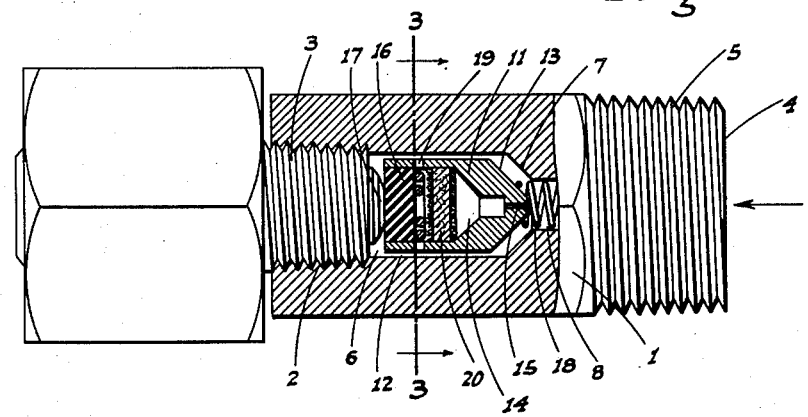
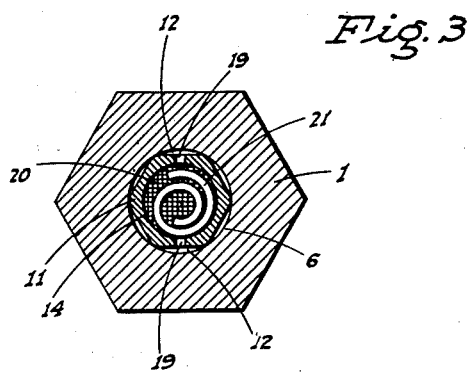
INVENTOR
Benjamin Baxter
ATTYS Patented Apr. 27, 1954

2,676,613

UNITED STATES PATENT OFFICE 2,676,613

DUAL PURPOSE VALVE UNIT

Benjamin Baxter, Fowler, Calif.

Application August 16, 1952, Serial No. 304,792

1 Claim. (Cl. 137—513.3)

This invention relates to a shock-absorbing valve unit adapted to be interposed in the line between a source of high pressure and a piece of apparatus to which the pressure is fed; the present invention representing an improvement over the valve unit shown in Patent No. 2,389,887, dated November 27, 1945, to Benjamin Baxter and S. M. Kandarian.

The previous device was constructed on the assumption that pressure was always available at the source, so that such pressure would always be retained in the apparatus. At times, however, the pressure may fail at the source at the very time it is desirable or even essential that the pressure shall be retained in the apparatus, without having to shut off a hand valve in the line to do so.

It is, therefore, the principal object of the present invention to provide an automatically functioning valve unit which retains the advantageous features of construction and operation of the previous valve unit, and in addition automatically acts to instantly prevent a back flow or discharge pressure from the apparatus in the event of failure of pressure at the source.

Still another object of the invention is to provide a dual-purpose valve unit which is practical, reliable, and durable, and one which is exceedingly effective for the purpose for which it is designed.

These objects are accomplished by means of such structure and relative arrangement of parts as will fully appear by a perusal of the following specification and claim.

In the drawings:

Fig. 1 is an enlarged elevation, mainly in section, of the improved valve unit, with the movable valve in its working position, or when the pressure is equalized at the source and in the apparatus.

Fig. 2 is a similar view showing the valve in a closed position, or when the pressure at the source is relatively low or non existent.

Fig. 3 is a cross section on line 3—3 of Fig. 2.

Referring now more particularly to the characters of reference on the drawings, the improved valve unit comprises an elongated body 1 tapped at one end, as at 2, to receive a fitting and coupling 3 which is connected to the initial source of pressure, and threaded at its opposite end 4, as at 5, for connection to the apparatus or device to which the pressure is to be normally fed.

An axial bore 6, mainly of substantial size communicating with fitting 3 and extending to the other threaded end 4, is formed in the body 1. This bore is formed intermediate its ends with a tapered valve seat 7 facing the fitting 3 and opening into a reduced bore portion 8 which forms a spring seating socket and is followed by a further reduced bore portion 9 so as to provide a spring seating shoulder 10 at the junction of bore portions 8 and 9.

A longitudinal valve body 11 is slidable in bore 6 between fitting 3 and seat 7, said valve body being formed in cross section so as to provide open-ended longitudinal passages 12 between said valve body and the wall of the bore 6. The valve body is tapered at its inner end, as at 13, to engage seat 7 in matching relation. The valve body 11 is formed with a relatively large socket 14 from the inner end of which a small bleed passage 15 leads to the tapered end of said valve body.

Tightly fitted into the outer end of the valve body socket is a valve disc 16 of rubber, or the like, adapted to flatly engage a seat 17 formed on the adjacent end of fitting 3. A compression spring 18, between shoulder 10 and the adjacent valve body, tends to shift said body so as to close disc 16 against the seat 17.

Formed in the body 11, behind the disc 16, are ports 19 connecting socket 14 and passages 12, while a filter plug 20 is disposed in the socket between said ports 19 and the bleed or passage hole 15. A spacer 21 is disposed in the socket 14 between disc 16 and plug 20, so as to keep the disc and plug apart and prevent them from shifting and shutting off the ports 19; this spacer being of suitable non-circular configuration, as shown in Fig. 3, so as to avoid choking said passages.

In operation, when the pressure is first turned into the unit from the source of supply, such pressure, acting directly on the disc 16, forces the valve body 11 suddenly ahead against the resistance of the relatively weak spring 18, and closes said valve against seat 7, temporarily preventing free flow of the pressure to the apparatus to which the unit is connected, as is desired. The pressure, however, can flow slowly to such apparatus by way of passages and ports 12 and 19, through filter 20 and thence through bleed hole or passage 15.

After a certain time, the pressure on both sides of the valve body will become equalized, whereupon spring 18 functions to open the valve, as shown in Fig. 1, and the pressure then flows normally through the unit from fitting 3, along passages 12, past valve seats 7 and 13, and thence through the remainder of the bore 6 to the apparatus.

If the apparatus springs a leak or otherwise allows the pressure to suddenly escape, the valve instantly closes, preventing the pressure at the source from being wasted except for the very small amount passing through the bleed hole 15.

If, however, the pressure should for any reason fail at the source, the spring 18 will instantly act to seat valve disc 16 against the seat 17 of intake fitting 3. At the same time, a pressure greater than that exerted by the light spring will positively hold disc 16 against seat 17, since the pressure in the apparatus then flows back through bore 6, along passages 12, and into valve socket 14 behind disc 16 to act on said disc in a direction to force the same against seat 17. This force is, of course, greater than that exerted by the pressure against the outer face of the disc 16, since the area of the latter exposed to said pressure on the outside of the valve is less than that exposed to the pressure inside the valve socket. The pressure will thus be retained to its full extent within the apparatus, until the pressure at the source can be restored.

This latter feature is especially necessary or valuable when two or more different gases are being fed to and used simultaneously in a mixing apparatus such as a burning torch, in order to prevent a possible back-flow and mixing of the separate gases in their initially separate tanks or containers.

When, for instance, oxygen is used in connection with other inflammable gases such as acetylene or hydrogen, and the source pressure of the oxygen drops below that of the inflammable gas pressure while the torch or other mixing apparatus is in use, the tendency of the inflammable gas, due to its higher pressure, would be to flow back to the oxygen container to equalize the pressure. This would set up a very dangerous and hazardous condition when the oxygen container is refilled to high pressure, should the previous contamination by the back-flowing inflammable gases have been overlooked and the container not having been emptied or cleaned out of its previous contaminated content.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claim.

Having thus described the invention, the following is claimed as new and useful, and upon which Letters Patent are desired:

A fluid pressure shock absorbing valve unit comprising a body having a bore therethrough formed intermediate its ends with a valve seat facing one end of the body, a pressure intake fitting connected to said end of the body and provided with a valve seat facing and spaced from the first named valve seat, the bore at the other end of the body being adapted for connection to apparatus in which the pressure is to be used, a plug valve slidable in the bore between the seats arranged to provide at least one longitudinal passage between the bore and plug valve on the outside of the latter, said plug valve at one end being formed to engage and close against the first named valve seat, the plug valve being formed with a relatively deep socket initially open to said opposite end thereof, a nonforaminous valve disc closing said open end of the socket, and a spring acting on the plug valve to shift the same lengthwise to dispose the disc against the last named valve seat; the plug valve having a port opening between said pasage and the socket behind the disc, and substantially the entire area of the latter being exposed to the pressure within the socket; the plug valve being formed with a bleed passage leading from the socket to said one end of the plug valve.

References Cited in the file of this patent
UNITED STATES PATENTS

| Number | Name | Date |
|---|---|---|
| 2,272,304 | Lohman | Feb. 10, 1942 |
| 2,353,161 | Heigis | July 11, 1944 |
| 2,389,887 | Baxter | Nov. 27, 1945 |